(12) United States Patent
Kish

(10) Patent No.: US 9,661,475 B2
(45) Date of Patent: *May 23, 2017

(54) DISTRIBUTED ACCESS POINT FOR IP BASED COMMUNICATIONS

(71) Applicant: Ruckus Wireless, Inc., Sunnyvale, CA (US)

(72) Inventor: William S. Kish, Saratoga, CA (US)

(73) Assignee: RUCKUS WIRELESS, INC., Sunnyvale, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/748,141

(22) Filed: Jun. 23, 2015

(65) Prior Publication Data

US 2015/0312727 A1     Oct. 29, 2015

Related U.S. Application Data

(60) Continuation of application No. 14/160,402, filed on Jan. 21, 2014, now Pat. No. 9,066,152, which is a
(Continued)

(51) Int. Cl.
*H04W 4/06* (2009.01)
*H04W 72/00* (2009.01)
(Continued)

(52) U.S. Cl.
CPC .......... *H04W 4/06* (2013.01); *H04N 21/6405* (2013.01); *H04N 21/6408* (2013.01);
(Continued)

(58) Field of Classification Search
None
See application file for complete search history.

(56) References Cited

U.S. PATENT DOCUMENTS 1,653,664 A    12/1927  Kirkup
4,176,356 A    11/1979  Foster et al.
(Continued)

FOREIGN PATENT DOCUMENTS

CN    1 965 598       5/2007
CN    102763378      10/2012
(Continued)

OTHER PUBLICATIONS

U.S. Appl. No. 14/979,018, William S. Kish, Increasing Reliable Data Throughput in a Wireless Network, filed Dec. 22, 2015.
(Continued)

*Primary Examiner* — Eunsook Choi
(74) *Attorney, Agent, or Firm* — Lewis Roca Rothgerber Christie LLP

(57) ABSTRACT

An apparatus for Internet-Protocol based communications in a wireless network includes a network interface, a controller, and memory. The interface receives a series of multicast data packets. The controller identifies one or more receiving nodes in the wireless network requesting data corresponding to the series of multicast data packets and determines that the effective unicast rate for one or more unicast data packets exceeds a minimum data rate of the series of multicast data packets using an 802.x protocol. The memory stores instructions that may be executable by a processor. Upon execution of the instructions by a processor, the received series of multicast data packets is converted into one or more unicast packets, the execution and conversion occurring in response to instructions received from the controller. A system for Internet-Protocol based communications in a wireless network implements such an apparatus in the context of an access point.

9 Claims, 5 Drawing Sheets

Related U.S. Application Data continuation of application No. 13/298,927, filed on Nov. 17, 2011, now Pat. No. 8,634,402, which is a continuation of application No. 12/719,006, filed on Mar. 8, 2010, now Pat. No. 8,089,949, which is a continuation-in-part of application No. 11/985,866, filed on Nov. 16, 2007, now Pat. No. 7,787,436, which is a division of application No. 11/232,196, filed on Sep. 20, 2005, now Pat. No. 7,505,447.

(60) Provisional application No. 60/625,331, filed on Nov. 5, 2004.

(51) Int. Cl.
    *H04N 21/6405*      (2011.01)
    *H04N 21/6408*      (2011.01)
    *H04W 28/06*      (2009.01)
    *H04W 88/08*      (2009.01)
    *H04W 28/22*      (2009.01)

(52) U.S. Cl.
    CPC ......... *H04W 28/06* (2013.01); *H04W 72/005* (2013.01); *H04W 88/08* (2013.01); *H04W 28/22* (2013.01)

(56) References Cited

U.S. PATENT DOCUMENTS

| | | | |
|---|---|---|---|
| 4,193,077 | A | 3/1980 | Greenberg et al. |
| 4,253,193 | A | 2/1981 | Kennard |
| 4,305,052 | A | 12/1981 | Baril et al. |
| 4,513,412 | A | 4/1985 | Cox |
| 4,814,777 | A | 3/1989 | Monser |
| 5,097,484 | A | 3/1992 | Akaiwa |
| 5,117,430 | A | 5/1992 | Berglund |
| 5,173,711 | A | 12/1992 | Takeuchi et al. |
| 5,203,010 | A | 4/1993 | Felix |
| 5,220,340 | A | 6/1993 | Shafai |
| 5,220,678 | A | 6/1993 | Feei |
| 5,361,256 | A | 11/1994 | Doeringer |
| 5,373,548 | A | 12/1994 | McCarthy |
| 5,408,465 | A | 4/1995 | Gusella et al. |
| 5,507,035 | A | 4/1996 | Bantz |
| 5,559,800 | A | 9/1996 | Mousseau et al. |
| 5,570,366 | A | 10/1996 | Baker |
| 5,608,726 | A | 3/1997 | Virgile |
| 5,636,213 | A | 6/1997 | Eastmond et al. |
| 5,754,145 | A | 5/1998 | Evans |
| 5,767,809 | A | 6/1998 | Chuang et al. |
| 5,802,312 | A | 9/1998 | Lazaridis et al. |
| 5,867,109 | A | 2/1999 | Wiedeman |
| 5,930,259 | A | 7/1999 | Katsube |
| 5,940,771 | A | 8/1999 | Gollnick et al. |
| 5,960,344 | A | 9/1999 | Mahany |
| 5,964,830 | A | 10/1999 | Durrett |
| 5,970,410 | A | 10/1999 | Carney et al. |
| 5,974,034 | A | 10/1999 | Chin et al. |
| 6,018,659 | A | 1/2000 | Ayyagari et al. |
| 6,034,638 | A | 3/2000 | Thiel et al. |
| 6,044,062 | A | 3/2000 | Brownrigg et al. |
| 6,088,570 | A | 7/2000 | Komara et al. |
| 6,094,177 | A | 7/2000 | Yamamoto |
| 6,132,306 | A | 10/2000 | Trompower |
| 6,181,697 | B1 | 1/2001 | Nurenbreg |
| 6,249,516 | B1 | 6/2001 | Brownrigg et al. |
| 6,266,528 | B1 | 7/2001 | Farzaneh |
| 6,266,537 | B1 | 7/2001 | Kashitani et al. |
| 6,292,153 | B1 | 9/2001 | Aiello et al. |
| 6,307,524 | B1 | 10/2001 | Britain |
| 6,317,599 | B1 | 11/2001 | Rappaport et al. |
| 6,326,922 | B1 | 12/2001 | Hegendoerfer |
| 6,337,628 | B2 | 1/2002 | Campana et al. |
| 6,337,668 | B1 | 1/2002 | Ito et al. |
| 6,339,404 | B1 | 1/2002 | Johnson et al. |
| 6,345,043 | B1 | 2/2002 | Hsu |
| 6,356,242 | B1 | 3/2002 | Ploussios |
| 6,356,243 | B1 | 3/2002 | Schneider et al. |
| 6,356,553 | B1 | 3/2002 | Nagami et al. |
| 6,356,905 | B1 | 3/2002 | Gershman et al. |
| 6,377,227 | B1 | 4/2002 | Zhu et al. |
| 6,392,610 | B1 | 5/2002 | Braun et al. |
| 6,393,261 | B1 | 5/2002 | Lewis |
| 6,404,386 | B1 | 6/2002 | Proctor, Jr. et al. |
| 6,404,775 | B1 | 6/2002 | Leslie et al. |
| 6,407,719 | B1 | 6/2002 | Ohira et al. |
| 6,414,955 | B1 | 7/2002 | Clare et al. |
| 6,418,138 | B1 | 7/2002 | Cerf et al. |
| 6,442,507 | B1 | 8/2002 | Skidmore et al. |
| 6,445,688 | B1 | 9/2002 | Garces et al. |
| 6,493,679 | B1 | 12/2002 | Rappaport et al. |
| 6,498,589 | B1 | 12/2002 | Horii |
| 6,499,006 | B1 | 12/2002 | Rappaport et al. |
| 6,505,253 | B1 | 1/2003 | Chiu |
| 6,507,321 | B2 | 1/2003 | Oberschmidt et al. |
| 6,570,883 | B1 | 5/2003 | Wong |
| 6,584,080 | B1 | 6/2003 | Ganz et al. |
| 6,625,454 | B1 | 9/2003 | Rappaport et al. |
| 6,674,459 | B2 | 1/2004 | Ben-Shachar et al. |
| 6,701,522 | B1 | 3/2004 | Rubin et al. |
| 6,704,301 | B2 | 3/2004 | Chari et al. |
| 6,714,551 | B1 | 3/2004 | Le-Ngoc |
| 6,725,281 | B1 | 4/2004 | Zintel et al. |
| 6,728,514 | B2 | 4/2004 | Bandeira et al. |
| 6,753,814 | B2 | 6/2004 | Killen et al. |
| 6,762,723 | B2 | 7/2004 | Nallo et al. |
| 6,778,517 | B1 | 8/2004 | Lou et al. |
| 6,779,004 | B1 | 8/2004 | Zintel |
| 6,819,287 | B2 | 11/2004 | Sullivan et al. |
| 6,836,481 | B1 | 12/2004 | Hotta |
| 6,873,627 | B1 | 3/2005 | Miller |
| 6,876,280 | B2 | 4/2005 | Nakano |
| 6,888,504 | B2 | 5/2005 | Chiang et al. |
| 6,888,893 | B2 | 5/2005 | Li et al. |
| 6,892,230 | B1 | 5/2005 | Gu et al. |
| 6,906,678 | B2 | 6/2005 | Chen |
| 6,910,068 | B2 | 6/2005 | Zintel et al. |
| 6,924,768 | B2 | 8/2005 | Wu et al. |
| 6,931,429 | B2 | 8/2005 | Gouge et al. |
| 6,941,143 | B2 | 9/2005 | Mathur |
| 6,950,019 | B2 | 9/2005 | Bellone et al. |
| 6,957,042 | B2 | 10/2005 | Williams |
| 6,957,277 | B2 | 10/2005 | Yagyu et al. |
| 6,961,028 | B2 | 11/2005 | Joy et al. |
| 6,973,622 | B1 | 12/2005 | Rappaport et al. |
| 6,975,834 | B1 | 12/2005 | Forster |
| 6,996,086 | B2 | 2/2006 | Wolfe et al. |
| 7,034,770 | B2 | 4/2006 | Yang et al. |
| 7,043,277 | B1 | 5/2006 | Pfister |
| 7,050,809 | B2 | 5/2006 | Lim |
| 7,053,853 | B2 | 5/2006 | Merenda et al. |
| 7,064,717 | B2 | 6/2006 | Kaluzni et al. |
| 7,076,274 | B2 | 7/2006 | Jollota et al. |
| 7,085,814 | B1 | 8/2006 | Ghandhi et al. |
| 7,089,307 | B2 | 8/2006 | Zintel et al. |
| 7,113,519 | B2 | 9/2006 | Hammel et al. |
| 7,130,895 | B2 | 10/2006 | Zintel et al. |
| 7,136,655 | B2 | 11/2006 | Skafidas et al. |
| 7,149,197 | B2 | 12/2006 | Garahi et al. |
| 7,157,757 | B2 | 1/2007 | Parekh et al. |
| 7,161,934 | B2 | 1/2007 | Buchsbaum |
| 7,164,667 | B2 | 1/2007 | Rayment et al. |
| 7,171,223 | B2 | 1/2007 | Herscovich et al. |
| 7,171,475 | B2 | 1/2007 | Weisman et al. |
| 7,187,925 | B2 | 3/2007 | Abhishek |
| 7,203,508 | B2 | 4/2007 | Ohkubo et al. |
| 7,269,174 | B2 | 9/2007 | Olson et al. |
| 7,283,494 | B2 | 10/2007 | Hammel et al. |
| 7,289,505 | B2 | 10/2007 | Sanchez |
| 7,292,617 | B2 | 11/2007 | Beasley et al. |
| 7,321,571 | B2 | 1/2008 | Schnack et al. |
| 7,336,642 | B2 | 2/2008 | Rich et al. |
| 7,355,997 | B2 | 4/2008 | Qian |
| 7,362,737 | B2 | 4/2008 | Behroozi |

(56) References Cited

U.S. PATENT DOCUMENTS

| | | |
|---|---|---|
| 7,369,510 B1 | 5/2008 | Wong |
| 7,489,932 B2 | 2/2009 | Chari et al. |
| 7,496,680 B2 | 2/2009 | Canright |
| 7,505,426 B2 | 3/2009 | Srikrishna et al. |
| 7,505,447 B2 | 3/2009 | Kish et al. |
| 7,515,589 B2 | 4/2009 | Bacher et al. |
| 7,522,731 B2 | 4/2009 | Kiemba et al. |
| 7,546,126 B2 | 6/2009 | Beasley et al. |
| 7,551,562 B2 | 6/2009 | Srikrishna et al. |
| 7,586,879 B2 | 9/2009 | Chari et al. |
| 7,672,274 B2 | 3/2010 | Bims |
| 7,697,504 B2 | 4/2010 | Chari et al. |
| 7,715,395 B2 | 5/2010 | Ginchereau et al. |
| 7,733,833 B2 | 6/2010 | Kalika et al. |
| 7,787,436 B2 | 8/2010 | Kish et al. |
| 7,852,837 B1 | 12/2010 | Au et al. |
| 7,853,829 B2 | 12/2010 | Younger et al. |
| 7,916,684 B2 | 3/2011 | Henderson et al. |
| 7,974,223 B2 | 7/2011 | Zelig et al. |
| 8,089,869 B2 | 1/2012 | Kisela et al. |
| 8,089,949 B2 | 1/2012 | Kish et al. |
| 8,125,975 B2 | 2/2012 | Kish et al. |
| 8,355,343 B2 | 1/2013 | Kish et al. |
| 8,547,899 B2 | 10/2013 | Kish |
| 8,619,662 B2 | 12/2013 | Kish |
| 8,634,402 B2 | 1/2014 | Kish |
| 8,638,708 B2 | 1/2014 | Kish |
| 8,688,834 B2 | 4/2014 | Fujimoto et al. |
| 8,780,760 B2 | 7/2014 | Kish |
| 8,824,357 B2 | 9/2014 | Kish et al. |
| 9,019,886 B2 | 4/2015 | Kish |
| 9,066,152 B2 | 6/2015 | Kish |
| 9,071,942 B2 | 6/2015 | Kish |
| 9,240,868 B2 | 1/2016 | Kish |
| 2001/0047474 A1 | 11/2001 | Takagi et al. |
| 2001/0055312 A1 | 12/2001 | Negus |
| 2002/0001310 A1 | 1/2002 | Mai |
| 2002/0031130 A1 | 3/2002 | Tsuchiya et al. |
| 2002/0036996 A1 | 3/2002 | Ozluturk et al. |
| 2002/0045435 A1 | 4/2002 | Fantaske |
| 2002/0047800 A1 | 4/2002 | Proctor, Jr. et al. |
| 2002/0080767 A1 | 6/2002 | Lee |
| 2002/0084942 A1 | 7/2002 | Tsai et al. |
| 2002/0105471 A1 | 8/2002 | Kojima et al. |
| 2002/0112058 A1 | 8/2002 | Weisman et al. |
| 2002/0114330 A1* | 8/2002 | Cheung ............... H04N 7/17336 370/390 |
| 2002/0143951 A1 | 10/2002 | Khan |
| 2002/0158798 A1 | 10/2002 | Chiang et al. |
| 2002/0158801 A1 | 10/2002 | Crilly, Jr. et al. |
| 2002/0164963 A1 | 11/2002 | Tehrani et al. |
| 2002/0170064 A1 | 11/2002 | Monroe et al. |
| 2002/0194367 A1 | 12/2002 | Nakamura et al. |
| 2003/0003917 A1 | 1/2003 | Copley et al. |
| 2003/0026240 A1 | 2/2003 | Eyuboglu et al. |
| 2003/0026268 A1 | 2/2003 | Nava |
| 2003/0030588 A1 | 2/2003 | Kalis et al. |
| 2003/0043786 A1 | 3/2003 | Kall et al. |
| 2003/0063591 A1 | 4/2003 | Leung et al. |
| 2003/0122714 A1 | 7/2003 | Wannagot et al. |
| 2003/0128711 A1 | 7/2003 | Olariu et al. |
| 2003/0129978 A1 | 7/2003 | Akiyama et al. |
| 2003/0133458 A1 | 7/2003 | Sato et al. |
| 2003/0169330 A1 | 9/2003 | Ben-Shachar et al. |
| 2003/0184490 A1 | 10/2003 | Raiman et al. |
| 2003/0189514 A1 | 10/2003 | Miyano et al. |
| 2003/0189521 A1 | 10/2003 | Yamamoto et al. |
| 2003/0189523 A1 | 10/2003 | Ojantakanen et al. |
| 2003/0210207 A1 | 11/2003 | Suh et al. |
| 2003/0227414 A1 | 12/2003 | Saliga et al. |
| 2003/0228857 A1 | 12/2003 | Maeki |
| 2003/0231593 A1 | 12/2003 | Bauman et al. |
| 2004/0008663 A1 | 1/2004 | Srikrishna |
| 2004/0014432 A1 | 1/2004 | Boyle |
| 2004/0017310 A1 | 1/2004 | Vargas-Hurlston et al. |
| 2004/0017860 A1 | 1/2004 | Liu |
| 2004/0027291 A1 | 2/2004 | Zhang et al. |
| 2004/0027304 A1 | 2/2004 | Chiang et al. |
| 2004/0028006 A1 | 2/2004 | Kayama |
| 2004/0032378 A1 | 2/2004 | Volman et al. |
| 2004/0036651 A1 | 2/2004 | Toda |
| 2004/0036654 A1 | 2/2004 | Hsieh |
| 2004/0041732 A1 | 3/2004 | Aikawa et al. |
| 2004/0048593 A1 | 3/2004 | Sano |
| 2004/0058690 A1 | 3/2004 | Ratzel et al. |
| 2004/0061653 A1 | 4/2004 | Webb et al. |
| 2004/0070543 A1 | 4/2004 | Masaki |
| 2004/0080455 A1 | 4/2004 | Lee |
| 2004/0085993 A1 | 5/2004 | Wentink |
| 2004/0095278 A1 | 5/2004 | Kanemoto et al. |
| 2004/0114535 A1 | 6/2004 | Hoffmann et al. |
| 2004/0125777 A1 | 7/2004 | Doyle et al. |
| 2004/0190477 A1 | 9/2004 | Olson et al. |
| 2004/0194143 A1* | 9/2004 | Hirose ............... H04N 7/17354 725/97 |
| 2004/0260800 A1 | 12/2004 | Gu et al. |
| 2004/0264463 A1 | 12/2004 | Fukushima |
| 2005/0002395 A1 | 1/2005 | Kondo |
| 2005/0009523 A1 | 1/2005 | Pekonen |
| 2005/0022210 A1 | 1/2005 | Zintel et al. |
| 2005/0032531 A1 | 2/2005 | Gong et al. |
| 2005/0041739 A1 | 2/2005 | Li et al. |
| 2005/0042988 A1 | 2/2005 | Hoek et al. |
| 2005/0074018 A1 | 4/2005 | Zintel et al. |
| 2005/0074019 A1 | 4/2005 | Handforth et al. |
| 2005/0074108 A1 | 4/2005 | Dezonno et al. |
| 2005/0097503 A1 | 5/2005 | Zintel et al. |
| 2005/0100016 A1* | 5/2005 | Miller ............... H04L 1/1614 370/390 |
| 2005/0135480 A1 | 6/2005 | Li et al. |
| 2005/0138137 A1 | 6/2005 | Encarnacion et al. |
| 2005/0138193 A1 | 6/2005 | Encarnacion et al. |
| 2005/0153720 A1 | 7/2005 | White et al. |
| 2005/0180381 A1 | 8/2005 | Retzer et al. |
| 2005/0185666 A1 | 8/2005 | Raya |
| 2005/0188193 A1 | 8/2005 | Kuehnel et al. |
| 2005/0226239 A1 | 10/2005 | Nishida et al. |
| 2005/0232179 A1 | 10/2005 | Da Costa et al. |
| 2005/0240665 A1 | 10/2005 | Gu et al. |
| 2005/0250544 A1 | 11/2005 | Grant et al. |
| 2005/0259682 A1* | 11/2005 | Yosef ............... H04L 12/18 370/468 |
| 2005/0267935 A1 | 12/2005 | Ghandhi et al. |
| 2005/0271070 A1 | 12/2005 | Mikami et al. |
| 2006/0018335 A1 | 1/2006 | Koch |
| 2006/0045089 A1 | 3/2006 | Bacher et al. |
| 2006/0092864 A1 | 5/2006 | Gupta et al. |
| 2006/0094371 A1 | 5/2006 | Nguyen |
| 2006/0098605 A1 | 5/2006 | Li |
| 2006/0098607 A1 | 5/2006 | Zeng et al. |
| 2006/0098613 A1 | 5/2006 | Kish et al. |
| 2006/0098616 A1 | 5/2006 | Kish et al. |
| 2006/0114881 A1 | 6/2006 | Chari |
| 2006/0123124 A1 | 6/2006 | Weisman et al. |
| 2006/0123125 A1 | 6/2006 | Weisman et al. |
| 2006/0123455 A1 | 6/2006 | Pai et al. |
| 2006/0133341 A1 | 6/2006 | Chari et al. |
| 2006/0165029 A1 | 7/2006 | Melpignano et al. |
| 2006/0168159 A1 | 7/2006 | Weisman et al. |
| 2006/0184660 A1 | 8/2006 | Rao et al. |
| 2006/0184661 A1 | 8/2006 | Weisman et al. |
| 2006/0184693 A1 | 8/2006 | Rao et al. |
| 2006/0224690 A1 | 10/2006 | Falkenburg et al. |
| 2006/0225107 A1 | 10/2006 | Seetharaman et al. |
| 2006/0227761 A1 | 10/2006 | Scott, III et al. |
| 2006/0239369 A1 | 10/2006 | Lee |
| 2006/0268881 A1 | 11/2006 | Moreton |
| 2006/0280131 A1 | 12/2006 | Rahman et al. |
| 2006/0291434 A1 | 12/2006 | Gu et al. |
| 2007/0002750 A1 | 1/2007 | Sang et al. |
| 2007/0002858 A1* | 1/2007 | Bichot ............... H04L 12/1836 370/390 |
| 2007/0010271 A1 | 1/2007 | Roy |
| 2007/0027622 A1 | 2/2007 | Cleron et al. |

(56) References Cited

U.S. PATENT DOCUMENTS

| | | |
|---|---|---|
| 2007/0030811 A1 | 2/2007 | Frei et al. |
| 2007/0072612 A1 | 3/2007 | Haraguchi et al. |
| 2007/0101020 A1 | 5/2007 | Lin et al. |
| 2007/0109961 A1 | 5/2007 | Liang |
| 2007/0135167 A1 | 6/2007 | Liu |
| 2007/0189283 A1 | 8/2007 | Agarwal et al. |
| 2007/0223451 A1 | 9/2007 | Ren et al. |
| 2007/0242602 A1 | 10/2007 | Pang et al. |
| 2007/0280168 A1 | 12/2007 | Shibata |
| 2008/0043638 A1 | 2/2008 | Ribiere |
| 2008/0063002 A1 | 3/2008 | Zheng et al. |
| 2008/0069068 A1 | 3/2008 | Dean et al. |
| 2008/0137681 A1 | 6/2008 | Kish et al. |
| 2008/0137682 A1 | 6/2008 | Kish et al. |
| 2008/0159207 A1 | 7/2008 | Levine et al. |
| 2008/0225804 A1 | 9/2008 | Thubert |
| 2008/0247317 A1 | 10/2008 | Weil et al. |
| 2008/0247327 A1 | 10/2008 | Weil et al. |
| 2008/0267116 A1 | 10/2008 | Kang et al. |
| 2008/0305743 A1 | 12/2008 | Aithal et al. |
| 2009/0019314 A1 | 1/2009 | Younger et al. |
| 2009/0028095 A1 | 1/2009 | Kish et al. |
| 2009/0040989 A1 | 2/2009 | Da Costa et al. |
| 2009/0067369 A1 | 3/2009 | Stamoulis |
| 2009/0073921 A1 | 3/2009 | Ji et al. |
| 2009/0080333 A1 | 3/2009 | Ozer et al. |
| 2009/0154359 A1 | 6/2009 | Strutt et al. |
| 2009/0180396 A1 | 7/2009 | Kish et al. |
| 2009/0207730 A1 | 8/2009 | Stamoulis et al. |
| 2009/0213730 A1 | 8/2009 | Zeng et al. |
| 2009/0225676 A1 | 9/2009 | Kisela et al. |
| 2009/0262677 A1 | 10/2009 | Banerjea et al. |
| 2010/0040056 A1 | 2/2010 | Kobayashi |
| 2010/0085916 A1 | 4/2010 | Yu et al. |
| 2010/0182944 A1 | 7/2010 | Kish et al. |
| 2011/0019653 A1 | 1/2011 | Seok |
| 2011/0096712 A1 | 4/2011 | Kish et al. |
| 2011/0119360 A1 | 5/2011 | Miu et al. |
| 2011/0119401 A1 | 5/2011 | Miu et al. |
| 2011/0158233 A1 | 6/2011 | Namgung |
| 2011/0216685 A1 | 9/2011 | Kish et al. |
| 2012/0063379 A1 | 3/2012 | Kish et al. |
| 2013/0010775 A1 | 1/2013 | Kish et al. |
| 2013/0194969 A1 | 8/2013 | Kish |
| 2014/0016563 A1 | 1/2014 | Kish |
| 2014/0071879 A1 | 3/2014 | Kish |
| 2014/0133385 A1 | 5/2014 | Kish |
| 2014/0177511 A1 | 6/2014 | Kish |

FOREIGN PATENT DOCUMENTS

| | | |
|---|---|---|
| EP | 0 352 787 | 7/1989 |
| EP | 0 534 612 | 3/1993 |
| EP | 1 315 311 | 5/2003 |
| EP | 1 450 521 | 8/2004 |
| EP | 1 608 108 | 12/2005 |
| EP | 1 653 664 | 5/2006 |
| EP | 2 350 863 | 8/2015 |
| GB | 2306278 | 4/1997 |
| JP | 2003-038933 | 7/1989 |
| JP | 2008-088633 | 2/1996 |
| JP | 2001-057560 | 2/2002 |
| JP | 2005-354249 | 12/2005 |
| JP | 2006-060408 | 3/2006 |
| VN | 31159 | 10/2012 |
| WO | WO 02/25967 | 3/2002 |
| WO | WO 02/49360 | 6/2002 |
| WO | WO 03/079484 | 9/2003 |
| WO | WO 2004/057817 | 7/2004 |
| WO | WO 2005/008938 | 1/2005 |
| WO | WO 2006/052639 | 5/2006 |
| WO | WO 2007/016326 | 2/2007 |
| WO | WO 2009/088488 | 7/2009 |
| WO | WO 2011/060454 | 5/2011 |
| WO | WO 2012/061531 | 5/2012 |

OTHER PUBLICATIONS

Akyildiz et al., "Wireless mesh networks: a survey," Computer Networks, 2005.

Areg Alimian et al., "Analysis of Roaming Techniques," doc.:IEEE 802.11-04/0377r1, Submission, Mar. 2004.

Cato et al., "Method for Easier, Better, and Faster Site Surveys for Wireless Networks," IBM Technical Disclosure Bulletin, vol. 40, No. 1, 1997.

Chang, Nicholas B. et al., "Optimal Channel Probing and Transmission Scheduling for Opportunistics Spectrum Access," Sep. 2007.

Chawla, "Design of a Wireless Backhaul Network for Microcells," 1999.

Cisco Systems, "Cisco Aironet Access Point Software Configuration Guide: Configuring Filters and Quality of Service," Aug. 2003.

Dell Inc., "How Much Broadcast and Multicast Traffic Should I Allow in My Network," PowerConnect Application Note #5, Nov. 2003.

Dunkels, Adam et al., "Connecting Wireless Sensornets with TCP/IP Networks," Proc. of the 2d Int'l Conf. on Wired Networks, Frankfurt, Feb. 2004.

Dunkels, Adam et al., "Making TCP/IP Viable for Wireless Sensor Networks," Proc. of the 1st Euro. Workshop on Wireless Sensor Networks, Berlin, Jan. 2004.

Dutta, Ashutosh et al., "MarconiNet Supporting Streaming Media Over Localized Wireless Multicast," Proc. of the 2d Int'l Workshop on Mobile Commerce, 2002.

Fair queuing, http://en.wikipedia.org/wiki/fair_queuing. Aug. 11, 2008.

Festag, Andreas, "What is MOMBASA?" Telecommunication Networks Group (TKN), Technical University of Berlin, Mar. 7, 2002.

Gillham, Burce et al. JUNOSe Internet Software for E-Series Routing Platforms Policy and QoS Configuration Guide, Release 7.0x, Sep. 7, 2005.

Golmie, Nada, "Coexistence in Wireless Networks: Challenges and System-Level Solutions in the Unlicensed Bands," Cambridge University Press, 2006.

Hewlett Packard, "HP ProCurve Networking: Enterprise Wireless LAN Networking and Mobility Solutions," 2003.

Hirayama, Koji et al., "Next-Generation Mobile-Access IP Network," Hitachi Review vol. 49, No. 4, 2000.

Hjalmtysson et al., Overcoming Last-Hop/First-Hop Problems in IP Multicast, Reykjavik University, Dept. of Computer Science, Ofanleiti 2, 103 Reykjavik, Iceland, (The Icelandic Center for Research under grant No. 020500002.). Sep. 16-19, 2003.

Ian R. Akyildiz, et al., "A Virtual Topology Based Routing Protocol for Multihop Dynamic Wireless Networks," Broadband and Wireless Networking Lab, School of Electrical and Computer Engineering, Georgia Institute of Technology, Jul. 1, 2001.

Information Society Technologies Ultrawaves, "System Concept / Architecture Design and Communication Stack Requirement Document," Feb. 23, 2004.

Johansson et al., "Relaying Access Points and Related Business Models for Low Cost Mobile Systems," 2004.

Ken Tang, et al., "MAC Layer Broadcast Support in 802.11 Wireless Networks," Computer Science Department, University of California, Los Angeles, 2000 IEEE, pp. 544-548.

Ken Tang, et al., "MAC Reliable Broadcast in Ad Hoc Networks," Computer Science Department, University of California, Los Angeles, 2001 IEEE, pp. 1008-1013.

Mawa, Rakesh, "Power Control in 3G Systems," Hughes Systique Corporation, Jun. 28, 2006.

Microsoft Corporation, "IEEE 802.11 Networks and Windows XP," Windows Hardware Developer Central, Dec. 4, 2001.

Pat Calhoun et al., "802.11r strengthens wireless voice," Technology Update, Network World, Aug. 22, 2005, http://www.networkworld.com/news/tech/2005/082208techupdate.html.

Steger, Christopher et al., "Performance of IEEE 802.11b Wireless LAN in an Emulated Mobile Channel," 2003.

Toskala, Antti, "Enhancement of Broadcast and Introduction of Multicast Capabilities in RAN," Nokia Networks, Palm Springs, California, Mar. 13-16, 2001.

(56) References Cited

OTHER PUBLICATIONS

Tsunekawa, Kouichi "Diversity Antennas for Portable Telephones," 39th IEEE Vehicular Technology, May 1-3, 1989, San Francisco, CA.
Vincent D. Park, et al., "A Performance Comparison of the Temporally-Ordered Routing Algorithm and Ideal Link-State Routing," IEEE, Jul. 1998, pp. 592-598.
Visoottiviseth et al., Sender-Initiated Mulitcast Forwarding Scheme, Telecommunications, 2003, ICT 2003 10th International Conference, pp. 334-339, downloaded on Mar. 26, 2009 from IEEE Xplore, 0-7803-7661 (c) 2003 IEEE.
Weighted Fair Queuing, http://en.wikipedia.org/wiki/Weighted_fair_queuing. Aug. 11, 2008.
Weighted Round Robin, http:en.wikipedia.org/wiki/Weighted_round_robin Aug. 8, 2008.
Wennstrom, Mattias et al., "Transmit Antenna Diversity in Ricean Fading MIMO Channels with Co-Channel Interference," 2001.
Yanikomeroglu, "Cellular Multihop Communications: Infrastructure-Based Relay Network Architecture for 4G Wireless Systems," 2004.
PCT Search Report and Written Opinion for PCT/US08/014148 mailed Mar. 30, 2009.
PCT Search Report and Written Opinion for PCT/US11/059019 mailed Feb. 21, 2012.
PCT Search Report and Written Opinion for PCT/US05/039760 mailed Sep. 14, 2006.
PCT Search Report and Written Opinion for PCT/US10/56908 mailed May 3, 2011.
Chinese Application No. 201080002467.X, Second Office Action dated Jan. 26, 2015.
Chinese Application No. 201080002467.X, Office Action dated Jul. 3, 2014.
Chinese Application No. 20058001629.7, Office Action dated Aug. 6, 2014.
Chinese Application No. 20058001629.7, Office Action dated Jan. 21, 2014.
Chinese Application No. 20058001629.7, Office Action dated Feb. 21, 2012.
European Application No. 10813061.8. Supplementary European Search Report dated Jul. 23, 2012.
European Application No. 10813061.8. Extended European Search Report dated Oct. 21, 2011.
Taiwan Application No. 103106913, Office Action dated May 28, 2015.
Taiwan Application No. 094138837, Office Action dated Apr. 25, 2013.
Taiwan Application No. 094138837, Office Action dated Nov. 28, 2011.
U.S. Appl. No. 12/008,715, Office Action mailed Sep. 2, 2011.
U.S. Appl. No. 12/008,715, Final Office Action mailed Nov. 23, 2010.
U.S. Appl. No. 12/008,715, Office Action mailed Jun. 7, 2010.
U.S. Appl. No. 12/008,715, Office Action mailed Oct. 16, 2009.
U.S. Appl. No. 13/736,017 Office Action mailed Nov. 21, 2013.
U.S. Appl. No. 14/160,402 Office Action mailed Oct. 22, 2014.
U.S. Appl. No. 11/232,196, Office Action mailed May 15, 2008.
U.S. Appl. No. 11/232,196, Final Office Action mailed Dec. 26, 2007.
U.S. Appl. No. 11/232,196, Office Action mailed Apr. 5, 2007.
U.S. Appl. No. 14/080,488, Office Action mailed Oct. 21, 2014.
U.S. Appl. No. 11/985,865, Office Action mailed Dec. 20, 2010.
U.S. Appl. No. 11/985,866, Office Action mailed Dec. 16, 2009.
U.S. Appl. No. 11/985,866, Office Action mailed May 29, 2009.
U.S. Appl. No. 11/267,477, Office Action mailed Apr. 8, 2015.
U.S. Appl. No. 11/267,477, Decision on Appeal mailed Nov. 14, 2014.
U.S. Appl. No. 11/267,477, Final Office Action mailed Oct. 6, 2010.
U.S. Appl. No. 11/267,477, Office Action mailed Jun. 16, 2010.
U.S. Appl. No. 11/267,477, Final Office Action mailed Jun. 10, 2009.
U.S. Appl. No. 11/267,477, Office Action mailed Sep. 25, 2008.
U.S. Appl. No. 12/181,274, Final Office Action mailed Jun. 19, 2013.
U.S. Appl. No. 12/181,274, Office Action mailed Nov. 15, 2012.
U.S. Appl. No. 12/181,274, Final Office Action mailed Jan. 18, 2012.
U.S. Appl. No. 12/181,274, Office Action mailed Jun. 10, 2011.
U.S. Appl. No. 14/028,323, Final Office Action mailed Jun. 12, 2015.
U.S. Appl. No. 14/028,323, Office Action mailed Oct. 14, 2014.
U.S. Appl. No. 12/947,800, Office Action mailed Mar. 19, 2015.
U.S. Appl. No. 12/947,800, Final Office Action mailed Jul. 17, 2013.
U.S. Appl. No. 12/947,800, Office Action mailed Sep. 26, 2012.
U.S. Appl. No. 12/947,803, Office Action mailed Mar. 12, 2015.
U.S. Appl. No. 12/947,803, Final Office Action mailed Jul. 17, 2013.
U.S. Appl. No. 12/947,803, Office Action mailed Aug. 27, 2012.
U.S. Appl. No. 12/938,316, Office Action mailed Nov. 20, 2012.
U.S. Appl. No. 14/106,514, Office Action mailed Sep. 22, 2014.
Final Office Action for co-pending U.S. Appl. No. 12/947,800, dated May 18, 2016 (26 sheets).
Final Office Action for co-pending U.S. Appl. No. 12/947,803, dated May 18, 2016 (31 sheets).
Office Action for co-pending U.S. Appl. No. 14/979,018, dated Nov. 4, 2016 (14 sheets).

* cited by examiner

DISTRIBUTED ACCESS POINT FOR IP BASED COMMUNICATIONS

CROSS-REFERENCE TO RELATED APPLICATIONS

The present application is a continuation of U.S. patent application Ser. No. 14/160,402 filed Jan. 21, 2014, which is a continuation of U.S. patent application Ser. No. 13/298,927 filed Nov. 17, 2011, now U.S. Pat. No. 8,634,402, which is a continuation of U.S. patent application Ser. No. 12/719,006 filed Mar. 8, 2010, now U.S. Pat. No. 8,089,949, which is a continuation-in-part of U.S. patent application Ser. No. 11/985,866 filed Nov. 16, 2007, now U.S. Pat. No. 7,787,436, which is a divisional of U.S. patent application Ser. No. 11/232,196 filed Sep. 20, 2005, now U.S. Pat. No. 7,505,447, which claims the priority benefit of U.S. provisional application 60/625,331 filed Nov. 5, 2004, the disclosures of which are incorporated herein by reference.

U.S. patent application Ser. No. 13/298,927 is related to U.S. patent application Ser. No. 11/010,076 filed Dec. 9, 2004, now U.S. Pat. No. 7,292,198; U.S. patent application Ser. No. 11/022,080 filed Dec. 23, 2004, now U.S. Pat. No. 7,193,562; and U.S. patent application Ser. No. 11/041,145 filed Jan. 21, 2005, now U.S. Pat. No. 7,362,280, the disclosures of which are incorporated herein by reference.

U.S. patent application Ser. No. 13/298,927 is related to U.S. patent application Ser. No. 11/985,865 filed Nov. 16, 2007, now U.S. Pat. No. 8,125,975, which is a divisional of U.S. patent application Ser. No. 11/232,196 filed Sep. 20, 2005, now U.S. Pat. No. 7,505,447, the disclosures of which are incorporated herein by reference.

BACKGROUND OF THE INVENTION

Field of the Invention

The present invention generally relates to communications networks and more particularly to systems and methods for increased data throughput in communications networks.

Description of the Related Art

Demand for multimedia applications, including audio and video data, is rapidly increasing. Some of the more popular uses of multimedia are real-time interactive applications, such as video and audio streaming, Internet Protocol TV (IPTV), transmission of lectures or speeches to a remote audience, and animated simulations. Even when data compression is used, multimedia applications require large amounts of bandwidth.

In an IEEE 802.11 wireless local area network (LAN), broadcast or multicast packet transmission enables bandwidth-intensive multimedia applications to transmit—simultaneously—audio and video data packets to each receiving node associated with a group of the wireless LAN. Broadcast packets are transmitted to all receiving nodes of the wireless LAN, whereas multicast packets are transmitted to two or more, but fewer than all, of the receiving nodes of the wireless LAN.

In the wireless LAN, a source node may transmit (e.g., via Ethernet) multicast packets to a multicast-enabled access point, and the access point sends the multicast packets via wireless transmission to destination receiving nodes that have identified themselves as part of the multicast group.

The access point of the wireless LAN may also support unicast packet transmission. For unicast transmission in the wireless LAN, the access point transmits one or more unicast packets to the receiving node identified by an intended destination address included in the unicast packets. After receiving the unicast packet, the receiving node transmits (approximately 9 μs later) an 802.11 acknowledgement (ACK) packet back to the access point. The 802.11 ACK mechanism provides reliable data transmission in the typically highly interfered 802.11 wireless network by confirming to the access point that the unicast packet was received.

A limitation with transmitting multicast packets in the wireless LAN is that the 802.11 ACK does not provide a reliable mechanism for ensuring that the receiving nodes actually received the multicast packets. For example, if the 802.11 access point were to transmit one or more multicast packets to a number of receiving nodes, and each of the receiving nodes were to respond essentially simultaneously with 802.11 ACK packets, the multiple ACK packets received by the access point would comprise "noise" during the period of the multiple simultaneous 802.11 ACKs. To the access point, these multiple simultaneous 802.11 ACKs are undecipherable. This condition may be referred to as a "multiple ACK problem."

Another limitation with transmitting multicast packets is that the wireless LAN may be limited in the bandwidth used for multicast packets. Because of the multiple ACK problem, the IEEE 802.11 specification for multicast dictates that transmission of multicast packets occur at a minimum allowable physical data rate. Because the receiving nodes may be at various distances from the source of the transmission, and may experience various interference levels, transmitting at the minimum allowable physical data rate improves the probability of reception of the multicast packets by each receiving node. For example, an 802.11 access point transmits multicast packets at a minimum allowable physical data rate of 1 Mbps for 802.11b and 6 Mbps for 802.11a. The receiving nodes do not transmit 802.11 ACK packets to verify reception of the multicast packets. Thus, without the 802.11 ACK mechanism, there is no verification of reception of the multicast packets.

Further, transmitting at the minimum allowable physical data rate under-utilizes available bandwidth in the wireless LAN, which otherwise is capable of supporting much higher data rates. In addition, transmitting at the minimum allowable physical data rate may make the wireless LAN unsuitable for applications that require high rate communication, such as multimedia applications.

SUMMARY OF THE PRESENTLY CLAIMED INVENTION

A claimed embodiment of the present invention is for a distributed access point for Internet-Protocol based communications in a wireless network.

An apparatus for Internet-Protocol based communications in a wireless network is claimed. The apparatus includes a network interface, a controller, and memory. The interface receives a series of multicast data packets. The controller identifies one or more receiving nodes in the wireless network requesting data corresponding to the series of multicast data packets and determines that the effective unicast rate for one or more unicast data packets exceeds a minimum data rate of the series of multicast data packets using an 802.x protocol. The memory stores instructions that may be executable by a processor. Upon execution of the instructions by a processor, the received series of multicast data packets is converted into one or more unicast packets, the execution and conversion occurring in response to instructions received from the controller.

A second claimed embodiment is for that of a system for Internet-Protocol based communications in a wireless network. The system includes an access point, which includes a network interface to receive a series of multicast data packets, and memory storing instructions executable by a processor to convert the received series of multicast data packets into one or more unicast packets in response to instructions received from a controller. The system also includes a controller that is physically distinct from but communicatively coupled to the access point. The controller identifies one or more receiving nodes in the wireless network requesting data corresponding to the series of multicast data packets, and determines that the effective unicast rate for the one or more unicast data packets exceeds a minimum data rate of the series of multicast data packets using an 802.x protocol.

In yet another claimed embodiment of the present invention, a system for Internet-Protocol based communications in a wireless network includes a motherboard and controller. The motherboard has a network interface to receive a series of multicast data packets, and memory storing instructions executable by a processor to convert the received series of multicast data packets into one or more unicast packets in response to instructions received from a controller. The motherboard further includes a radio. A controller is communicatively coupled to the radio at the first motherboard by way of a wireless network. The controller identifies one or more receiving nodes in the wireless network requesting data corresponding to the series of multicast data packets, and determines that the effective unicast rate for the one or more unicast data packets exceeds a minimum data rate of the series of multicast data packets using an 802.x protocol.

DETAILED DESCRIPTION

The systems and methods disclosed herein enable data throughput in communication networks greater than that which is provided in the prior art. For example, the system and method disclosed herein support bandwidth-intensive multimedia applications over wireless LANs. Nodes of a communication network may be referred to as a host, a source, a destination, a node, a receiving node, an access point, and a station. These references should not be considered in a limiting sense; for example, a "receiving node" is in no way limited to the function of receiving only, but is at least capable of receiving. Additionally, the term "group packet" includes a multicast packet, a broadcast packet, and any packet whose destination address indicates one or more addresses and/or nodes of the communications network.

According to one embodiment, a wireless local area network (LAN) comprises an access point configured to receive a multicast or broadcast packet from a source. The multicast or broadcast packet is addressed to a group comprising one or more nodes of a communications network (e.g., stations associated with the access point of the wireless LAN). The access point determines whether to convert the multicast or broadcast packet into one or more unicast packets for sequential transmission to the one or more nodes or whether to transmit the multicast or broadcast packet to the group. If the access point transmits the multicast or broadcast packet without conversion, the access point may determine a lowest common denominator data rate based on data rates for transmitting multicast or broadcast packets to the one or more nodes and transmits the multicast or broadcast packet to the group at the lowest common denominator rate.

Figure 1:
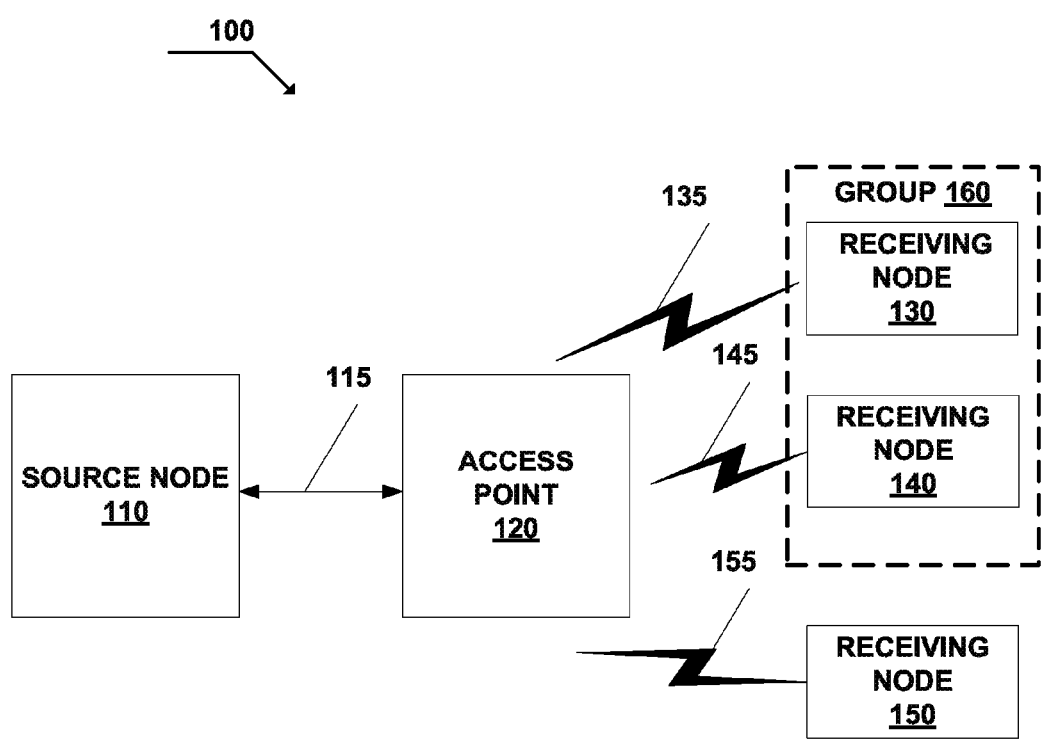
FIG. 1 illustrates a block diagram of a system for multicast transmission in a wireless local area network.

FIG. 1 illustrates a block diagram of a system 100 for multicast packet transmission in a wireless local area network, in accordance with one embodiment of the present invention. The system 100 comprises a source node 110, a network link 115, an access point 120, receiving nodes 130, 140, and 150, wireless links 135, 145, and 155, and a group 160 comprising two or more of the receiving nodes (e.g., the receiving nodes 130 and 140). The source node 110 is configured to communicate with the access point 120 over the network link 115. The access point 120 is configured to communicate with the receiving nodes 130-150 over the wireless links 135-155 that form the wireless LAN.

The source node 110 is any device capable of network communication including unicast or multicast packet transmission with the access point 120 over the network link 115. The source node 110 may comprise, for example, a personal computer, a server, a network attached storage device, or a network video distribution device. The source node 110 may support networking protocols such as Transmission Control Protocol/Internet Protocol (TCP/IP), User Datagram Protocol (UDP/IP), and/or Internet Group Management Protocol (IGMP), and may support unicast, multicast, and/or broadcast packet transmission of network data.

The source node 110 is configured to transmit one or more group packets addressed to the group 160 (e.g., one or more multicast or broadcast packets) over the network link 115. The network link 115 may be a wired or wireless network link. In one embodiment, the network link 115 comprises a UDP/IP connection. In one example, the source node 110 comprises an IPTV video server (not shown) that transmits the multicast packets, providing a remote video stream to the group 160 through the access point 120. Although discussed in regard to multicast transmission, the group packets may comprise a packet whose destination address specifies all (i.e., broadcast), or less than all (i.e., multicast) of the receiving nodes 130-150.

The receiving nodes 130-150 each comprise any device capable of receiving network communication from the source node 110 through the access point 120 over the wireless links 135-155. The receiving nodes 130-150 may comprise devices such as personal computers, PDAs, cell phones, and/or internet enabled televisions. In one example, the receiving nodes 130-140 of the group 160 may comprise TV set-top boxes configured to receive a video stream provided by the IPTV server at the source node 110 to the group 160. Although described as the source node 110 and the receiving nodes 130-150, it should be noted that the source node 110 may also be the destination node of a data packet as well as the receiving nodes 130-150 may also be the source node of a data packet.

As described further herein, the access point 120 is configured to transmit the video stream to the receiving node 130 and the receiving node 140 either simultaneously as a multicast packet, or sequentially as one or more unicast packets to each of the receiving nodes 130 and 140. The access point 120 is virtually any device capable of acting as a bridge in a peer-to-peer connection in the wireless LAN or as a bridge between the network link 115 and the wireless links 135-155. The access point 120 may be configured to convert the multicast packet into one or more unicast packets, as discussed further with respect to FIG. 2. The access point 120 may include a processor, a memory, and additional circuitry that provides or assists in providing the bridge and/or the multicast packet conversion. The access point 120 may use the IEEE 802.11 protocol, such as 802.11a or 802.11b, to communicate with the receiving nodes 130-150. It will be appreciated that the access point 120 may incorporate other wireless protocols, such as 802.11g, 802.16, or Bluetooth.

The access point 120 may support multicast control protocols, such as IGMP, and may be configured as a multicast-enabled router. A multicast control protocol enables the access point 120 to determine from the receiving nodes (e.g., the receiving nodes 130-150) which group(s) (e.g., the group 160) the receiving nodes 130-150 are associated with. Some examples of multicast control protocols are IGMP, Protocol-Independent Multicast (PIM), Real-Time Streaming Protocol (RTSP), Multiprotocol Border Gateway Protocol (MBGP), Multicast Source Discovery Protocol (MSDP), Simple Service Discovery Protocol (SSDP), and Source Specific Multicast (SSM). For example, the receiving node 130 may send a multicast control protocol packet to the access point 120 to change the channel for an IPTV multicast stream received from the source node 110. The multicast control protocol packet informs the access point 120 that the receiving node 130 is interested in receiving group packets for the selected channel.

The access point 120 of some embodiments is further configured to maintain information about "associated nodes." Associated nodes are devices that have negotiated a wireless communication link (e.g., the wireless link 135) with the access point 120. For example, when the receiving node 130 initially associates with the access point 120 to negotiate the wireless link 135, the receiving node 130 provides a Media Access Control (MAC) or hardware address that uniquely identifies the receiving node 130. The receiving node 130 may also provide a list of allowable physical data rates (e.g., 1 Mbps-54 Mbps) at which it may communicate with the access point 120. The access point 120 may store such information about the associated nodes in memory, for example.

As described further herein, the system 100 improves multicast data throughput in the wireless LAN because the access point 120 of one embodiment is configured to convert the multicast packet addressed to the group 160 into one or more unicast packets addressed to the receiving nodes 130-140. The access point 120 may transmit the one or more unicast packets sequentially to the receiving nodes 130-140 at a higher data rate than the minimum data rate used for 802.11 multicast transmission. Further, the access point 120 of this embodiment would ensure reliable transmission of the converted multicast packet because the access point 120 would be able to service 802.11 ACK packets generated by the receiving nodes 130-140. In some embodiments, the access point 120 may determine not to convert the multicast packet into one or more unicast packets, but instead may transmit the multicast packet to the receiving nodes of the group 160 at a relatively higher data rate than the minimum allowable physical data rate used for 802.11 multicast packet transmission.

Figure 2:
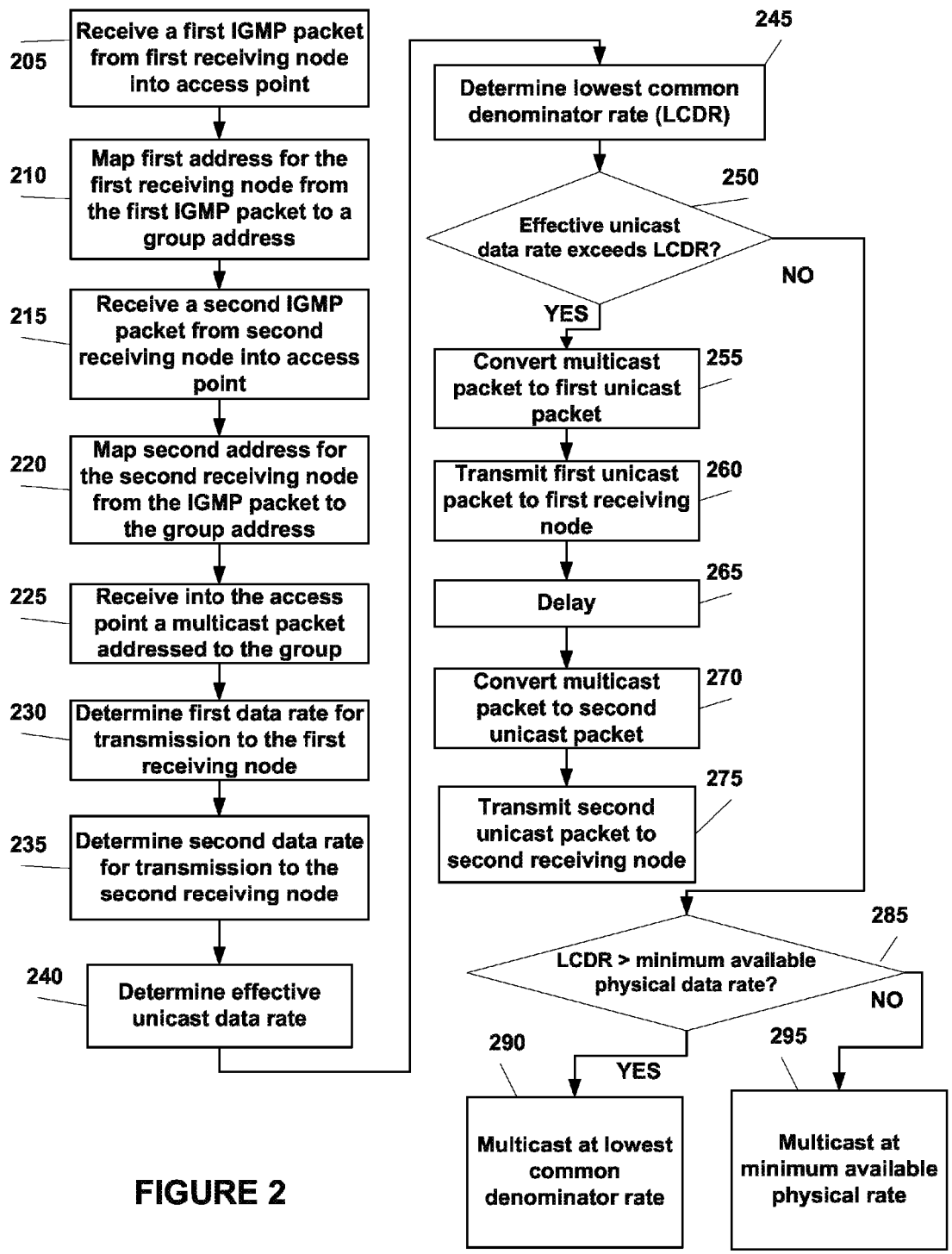
FIG. 2 illustrates an exemplary method for multicast or unicast transmission in the wireless local area network of FIG. 1.

FIG. 2 illustrates an exemplary method for multicast or unicast transmission in the wireless local area network of FIG. 1, in accordance with one embodiment of the present invention. The steps of the exemplary method are described as occurring in particular order, but it will be appreciated that certain steps may be rearranged to provide a similar result. The method determines whether to convert a multicast packet into one or more unicast packets or whether to transmit the multicast packet. The method also determines at what rate to transmit the multicast packet and the one or more unicast packets. The method begins with the access point 120 already associated with receiving nodes 130-150.

In step 205, the access point 120 receives a first join request (e.g., a multicast control protocol packet such as an IGMP join request) from the first receiving node (e.g., the receiving node 130) containing a first address for the receiving node 130. The access point 120 uses the join request to correlate the receiving node 130 with the address of the group 160. In IGMP, a multicast client (e.g., the receiving node 130) joins a multicast group (e.g., the group 160) to enable group reception of a multicast traffic stream. When the access point 120 receives the IGMP join request from the receiving node 130, the access point 120 inspects the IGMP packet and determines the required join information.

In this embodiment, the access point 120 does not itself use the IGMP protocol. Regardless, the system 100 takes advantage of the fact that the IGMP join requests from the receiving nodes 130-140 to the source node 110 pass through the access point 120. The access point 120 "sniffs" or samples the IGMP join requests to map the hardware (MAC) address of the receiving nodes 130 and 140 with the address of the group 160. In some embodiments, the access point 120 "speaks" the IGMP protocol. The access point 120 may map the IP addresses (instead of the MAC addresses) of the receiving nodes 130 and 140 to the address of the group 160.

In the alternative to sniffing or speaking IGMP or other control protocols from the receiving nodes 130-150, the access point 120 may maintain a map that contains the hardware addresses of all or a subset of the receiving nodes 130-150 that are associated with the access point 120. The access point 120 may use the map to query the receiving nodes 130-150 to determine which of the receiving nodes 130-150 are interested in receiving multicast traffic addressed to the group 160. These maps of MAC addresses or IP addresses allow the access point 120 to convert the multicast packet received from the source node 110 and addressed to the group 160 into one or more unicast packets addressed to the receiving nodes 130-140 of the group 160.

In step 210, the access point 120 maps the first address of the receiving node 130 from the IGMP packet to the address of the group 160. In step 215, the access point 120 receives a second join request (e.g., a second IGMP join request) from a second receiving node (e.g., the receiving node 140). In step 220, the access point 120 maps a second address of the receiving node 140 to the address of the group 160.

In step 225, the access point 120 receives the multicast packet addressed to the group 160. In step 230, the access point 120 determines a first data rate (e.g., 54 Mbps) by which the access point 120 may reliably transmit (e.g., including the 802.11 ACK mechanism) one or more unicast packets to the receiving node 130. In step 235, the access point 120 determines a second data rate (e.g., 24 Mbps) by which the access point 120 may reliably transmit one or more unicast packets to the receiving node 140. Although not depicted, in some embodiments the access point 120 may determine additional (e.g., a third or more) data rates by which the access point 120 may reliably transmit one or more unicast packets to a third receiving node (e.g., the receiving node 150 which would be part of the group 160).

In step 240, the access point 120 determines an effective unicast rate. As discussed further with respect to FIG. 3, the effective unicast rate corresponds to a combined rate for converting the multicast packet into one or more unicast packets and sending the one or more unicast packets to the receiving nodes 130 and 140 of the group 160 at the first and second (and third . . . ) data rates. The effective unicast rate depends on the total number of bits included in the unicast packets, including additional data packet overhead (e.g., additional bits in the unicast packet as compared to the multicast packet). The effective unicast rate also depends on computational time associated with converting the multicast packet into one or more unicast packets. The effective unicast rate is further based on the duration for reception and processing of ACK packets from the receiving nodes of the group 160. Further, the effective unicast rate is based on the number of receiving nodes in the group 160, because each additional receiving node in the group 160 proportionally lowers the effective unicast rate. One method for determining the effective unicast rate is presented in U.S. patent application Ser. No. 11/180,329 and entitled "System and Method for Transmission Parameter Control for an Antenna Apparatus with Selectable Elements," the disclosure of which is incorporated by reference.

As described further, rather than converting the multicast packet to unicast packets, the access point may transmit at a "lowest common denominator rate" to the group 160. For example, the lowest common denominator rate may be higher than the effective unicast rate, particularly with a large number of receiving nodes in the group 160 each receiving at a relatively high rate. For example, the group 160 may comprise the receiving nodes 130, 140, and 150. The receiving node 130 may receive packets at a physical data rate of 54 Mbps, the receiving node 140 may receive packets at a physical data rate of 54 Mbps, and the receiving node 150 may receive packets at a physical data rate of 54 Mbps. The lowest common denominator rate for this example is 54 Mbps, which may be higher than the effective unicast rate. In step 245, the access point 120 determines the lowest common denominator rate (LCDR) for transmitting the multicast packet simultaneously to the receiving nodes of the group 160.

In steps 250-295, the access point 120 determines whether to transmit unicast or multicast packets, and at what rate to transmit the unicast or multicast packets. Specifically, in steps 250-275, the access point 120 may determine to convert the multicast packet into one or more first unicast packets addressed to the receiving node 130 and one or more second unicast packet addressed to the receiving node 140 for transmission. Alternatively, in steps 285-295, the access point 120 may determine to transmit the multicast packet simultaneously to the receiving nodes 130-140 of the group 160 and not convert the multicast packet into unicast packets. Further, in steps 285-295 the access point 120 determines whether to transmit at the lowest common denominator rate if the lowest common denominator rate is higher than the minimum allowable physical data rate.

In step 250, the access point 120 determines if the effective unicast rate exceeds the lowest common denominator rate. For example, in an 802.11a wireless LAN with the receiving nodes 130, 140, and 150 in the group 160, the first data rate may be 54 Mbps, the second data rate may be 6 Mbps, and the third data rate may be 54 Mbps. The effective unicast rate, given the number of data bits in the unicast packets, packet overhead, conversion processing time, and the like may be 11.5 Mbps, for example. Accordingly, the effective unicast rate of 11.5 Mbps exceeds the lowest common denominator rate of 6 Mbps (i.e., the minimum allowable physical data rate for 802.11a), so the access point 120 will convert the multicast packet into one or more unicast packets in steps 255-275.

In step 255, the access point 120 converts the multicast packet to a first unicast packet addressed to the receiving node 130. In step 260, the access point 120 transmits the first unicast packet to the receiving node 130 at the first data rate. After transmission of the first unicast packet, in step 265 the access point 120 may delay for a predetermined delay period before converting the multicast packet into a second unicast packet and transmitting the second unicast packet to the receiving node 140 in steps 270-275. The delay period is computed to allow the receiving node 130 sufficient time to generate an 802.11 ACK that the access point 120 may receive to verify reliable transmission and reception of the first unicast packet. The access point 120 may compute the delay period based on several factors. For example, the access point 120 may compute the delay based on computational time needed by the access point 120 to convert the multicast packet into the first unicast packet. The delay may include data packet overhead (e.g., additional bits in the first unicast packet that reduce the first data rate to a relatively lower "user" data rate). Further, the access point 120 may retransmit the first unicast packet to the receiving node 130 if the access point 120 does not receive the 802.11 ACK from the receiving node 130 for the first unicast packet, adding to the delay.

In step 270, the access point 120 converts the multicast packet from the source node 110 into a second unicast packet addressed to the receiving node 140. In step 275, the access point 120 transmits the second unicast packet at the second data rate to the receiving node 140. In similar fashion to the method described above with respect to steps 260-265 for the first unicast packet, the access point 120 awaits an 802.11 ACK from the receiving node 140 to ensure reliable transmission and reception of the second unicast packet. The access point 120 may retransmit the second unicast packet to the receiving node 140 if the access point 120 does not receive the 802.11 ACK from the receiving node 140. Although not depicted, the steps 265 to 275 may be repeated for additional (e.g., third . . . ) receiving nodes in the group 160.

Optionally, the access point 120 may determine in step 260 and step 275 whether one of the receiving nodes of the group 160 comprises a multicast data transmitter. For example, if the receiving node 130 acts as the source node 110 for sending the multicast packet through the access point 120 to the receiving nodes 140 and 150 of the group 160, the access point 120 need not retransmit the converted unicast packet back to the receiving node 130. Although sending the unicast packet back to the receiving node 130 is legitimate practice in 802.11, doing so wastes network bandwidth.

At step 250, if the effective unicast rate does not exceed the lowest common denominator rate, the access point 120 may determine not to convert the multicast packet into one or more unicast packets for sequential transmission to each receiving node in the group 160. Accordingly, in step 285, the access point 120 determines whether the LCDR exceeds the minimum allowable data rate. For example, if the receiving node 130 is capable of receiving at 54 Mbps and the receiving node 140 is capable of receiving at 24 Mbps, the LCDR of 24 Mbps exceeds the minimum allowable data rate of 6 Mbps. Accordingly, in step 290 the access point 120 will transmit the multicast packet to the group 160 at the LCDR of 24 Mbps. Alternatively, at step 285 if the receiving node 130 is capable of receiving at 54 Mbps and the receiving node 140 is capable of receiving at only 6 Mbps, for example, the LCDR does not exceed the minimum allowable data rate of 6 Mbps. Accordingly, in step 295, the access point 120 will transmit the multicast packet to the group 160 at the minimum allowable data rate of 6 Mbps.

The methods described with respect to FIG. 2 advantageously achieve higher data throughput than traditional multicast transmission, by converting multicast packets in the access point 120 into one or more unicast packets that may be transmitted sequentially to each receiving node of the group 160 at a relatively higher data rate. Further, converting the multicast packet into unicast packets affords higher data transmission reliability because the unicast packets are verified by ACK responses from each receiving node of the group 160. Additionally, if the access point 120 determines not to convert multicast packets into unicast packets, the access point 120 may transmit the multicast packet at the lowest common denominator rate, which is a higher physical data rate than the minimum allowable physical data rate defined in the IEEE 802.11 standard.

Although FIGS. 1 and 2 generally describe multicast data flow from the source node 110 to the group 160 (i.e., left to right in FIG. 1), the methods described with respect to FIG. 2 are applicable to multicast control protocol packets that flow in the opposite direction (e.g., from right to left in FIG. 1). For example, the system 100 may include a source node (e.g., the receiving node 130) configured to transmit a group packet to a destination node (e.g., the access point 120). The receiving node 130 sends a multicast control protocol packet, such as an IGMP join request, over the wireless link 135 to the access point 120 to join a group (e.g., group 160) receiving an IPTV multimedia multicast stream. To provide more effective use of the available bandwidth of the wireless link 135, and to provide reliable transmission of the multicast control protocol packet, the receiving node 135 may convert the multicast control protocol packet to one or more unicast packets for transmission to an acknowledgement by the access point 120.

In one example, the receiving node 130 determines a first data rate for transmitting the group packet and determines a second data rate based upon converting the group packet to a unicast packet addressed to the access point 120. The receiving node 130 transmits the unicast packet at the second data rate through the wireless link 135 to the access point 120 if the first data rate for transmitting the group packet is less than the second data rate for transmitting the unicast packet. As discussed herein, the receiving node 130 transmits the unicast packet at a higher physical data rate than specified for multicast transmission. Upon receipt of the unicast packet, the access point 120 sends an ACK to acknowledge receipt of the unicast packet.

If the first data rate for transmitting the group packet is greater than the second data rate for transmitting the unicast packet, the receiving node 130 may transmit the group packet through the wireless link 135. As previously discussed, the receiving node 130 may transmit the group packet at the lowest common denominator rate. The access point 120 then receives the group packet and processes the multicast control protocol packet. Therefore, in these embodiments, the receiving node 130 and the access point 120 individually determine whether transmitting the group packet or converting the group packet to one or more unicast packets allows for a more effective use of the available bandwidth and for reliable transmission.

Figure 3:
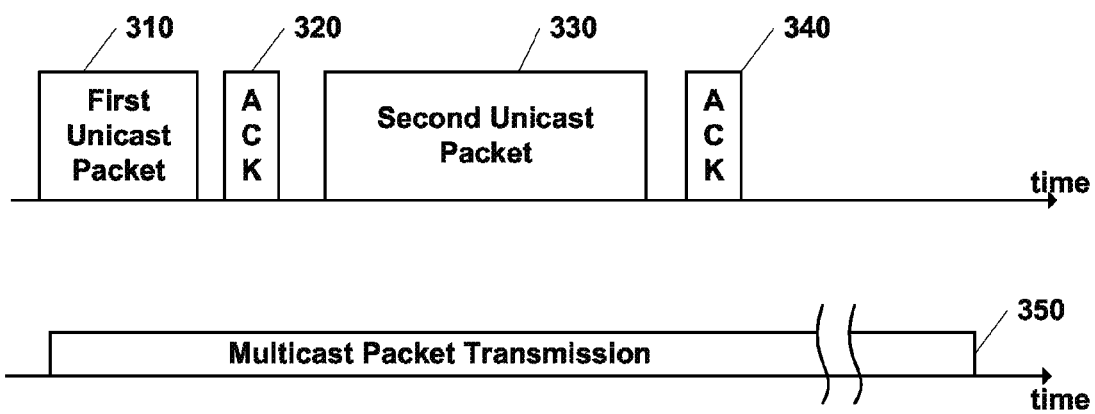
FIG. 3 illustrates an exemplary timing diagram illustrating conversion of multicast packets into unicast packets as described with respect to FIGS. 1-2.

FIG. 3 illustrates an exemplary timing diagram comparing the conversion of the multicast packet into one or more unicast packets, as described in FIGS. 1-2, as compared to multicast packet transmission, in accordance with one embodiment of the present invention. A first time interval 310 indicates the time needed for the access point 120 to convert the multicast packet received from the source node 110 into the first unicast packet and transmit the first unicast packet to the receiving node 130, for example, at 54 Mbps. The time interval 310 may vary depending upon at least the first data rate, the number of data bits in the first unicast packet, and the conversion time needed by the access point 120 to convert the multicast packet into the first unicast packet. After the first unicast packet is transmitted to the receiving node 130, an ACK time interval 320 indicates the time needed for the receiving node 130 to return the 802.11 ACK corresponding to the first unicast packet and for the access point 120 to process the 802.11 ACK packet.

Similarly, a second time interval 330 indicates the time needed for the access point 120 to convert the multicast packet received from the source node 110 into the second unicast packet and transmit the second unicast packet to the receiving node 140 at the second data rate, for example, 18 Mbps. A second ACK time interval 340 indicates the time needed for the receiving node 140 to return an 802.11 ACK corresponding to the second unicast packet and for the access point 120 to process the 802.11 ACK packet. In comparison, a multicast time interval 350 indicates the duration for the access point 120 to receive and transmit the multicast packet simultaneously to the receiving nodes 130 and 140 at either the lowest common denominator rate or the minimum allowable physical data rate.

Because the duration of the combined time intervals 310, 320, 330, and 340 is shorter than the duration of the multicast time interval 350, the system and method described herein advantageously achieve a higher data throughput by converting the multicast packet to sequential unicast packets. Further, as the duration of the time intervals 310 and 320 increases because of interference in the wireless links 135 and 145 (FIG. 1) leading to lower first and second data rates, for example, the combined duration of the time intervals 310, 320, 330, and 340 may exceed the multicast time interval 350. In such case, the lowest common denominator rate may provide a higher data rate than the minimum allowable data rate. Another advantage, therefore, is graceful degradation of the overall data transmission rate with changes in the wireless LAN.

Figure 4:
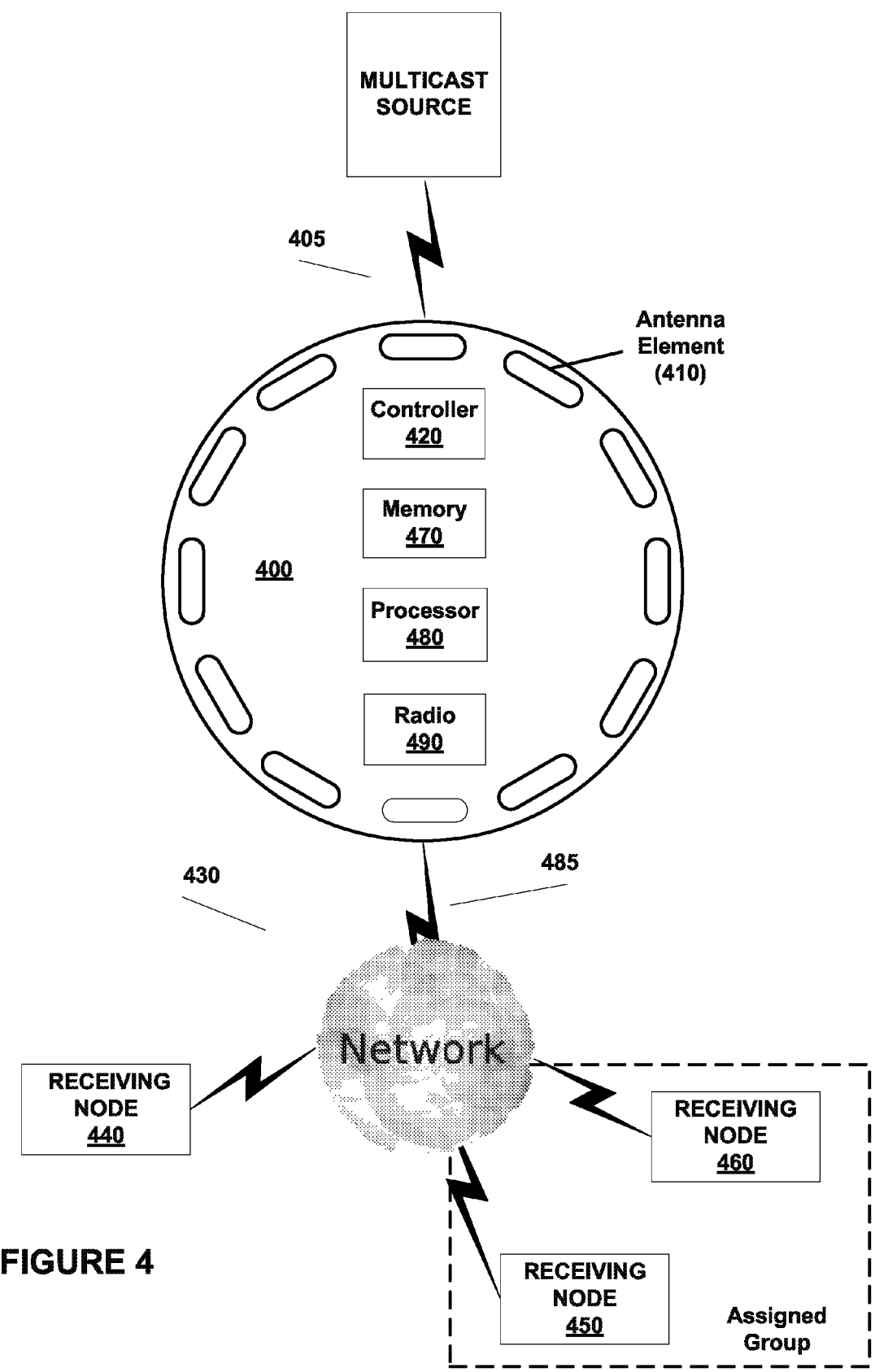
FIG. 4 illustrates an apparatus for Internet-Protocol based communications in a wireless network and that may implement multicast to unicast conversion.

FIG. 4 illustrates an exemplary apparatus 400 for Internet-Protocol based communications in a wireless network and that may implement multicast to unicast conversion as described above. The apparatus 400 may operate in the context of an access point or any other network enabled communications node, including nodes like those previously described. The apparatus 400 of FIG. 4 includes a network interface 410 that receives a series of multicast data packets (405). The network interface 410, as illustrated in FIG. 4, constitutes a series of selectable antenna elements receiving wirelessly transmitted data. In some implementations, however, the network interface for the receipt of multicast data packets may be a wired data connection and be separate from a network interface allowing for wireless transmission of data.

A controller 420 at apparatus 400 identifies one or more receiving nodes 440 . . . 460 in the wireless network 430 that are requesting data corresponding to the series of multicast data packets. In addition to identifying receiving nodes in the network, the controller 420 is capable of determining, as generally described above, that the effective unicast rate for one or more unicast data packets exceeds a minimum data rate of the series of multicast data packets using an 802.x protocol.

The controller 420 of FIG. 4 may be implemented as a software application. This application may be stored in memory (not shown) independent of the memory (470) storing instructions executable by processor 480. The controller software may be executable by processor 480 or an additional processor (not shown). The controller software application could alternatively be stored in the same memory 470 storing the instructions executable by processor 480 to convert the received series of multicast data packets into one or more unicast packets. The controller 420 may also operate in the context of an application specific microprocessor.

Regardless of any particular implementation, the controller 420 identifies one or more receiving nodes (440, 450, 460) to determine that the effective unicast rate for the one or more unicast data packets exceeds a minimum data rate of the series of multicast data packets as noted above. The controller 420 may further assign each of the one or more receiving nodes in the wireless network to a group of receiving nodes.

The controller 420 may operate in accordance with factory-installed instructions or a factory-configuration for control of the apparatus 400. The controller 420 may allow for updating or reconfiguration in accordance with user-defined parameters or as otherwise allowed for by controller software. Memory 470 at the apparatus 400 stores instructions executable by a processor 480 to convert the received series of multicast data packets into one or more unicast packets (485) in response to instructions received from the controller 420. Transmission of the packets 485 may occur by way of radio 490 and antenna elements (410), which may be the same selectable antenna elements (or selected configurations thereof) as described above.

Some embodiments of the apparatus 400 may include multiple radios (not shown). A group of receiving nodes may be assigned to a particular one of the multiple radios. Each of the radios may be coupled to a wireless network interface, such as an antenna element, to wireless transmit the one or more unicast data packets to the group of receiving nodes assigned to the radio using an 802.x protocol. In those embodiments utilizing a single radio, like that of FIG. 4, a wireless network interface transmits—wirelessly—the one or more unicast data packets to a group of receiving nodes from the one or more receiving nodes requesting the data corresponding to the one or more multicast data packets.

The controller 420 and multiple radios (or single radio 490) may be embedded on a common motherboard or on separate motherboards within the apparatus 400. A controller 420 and wireless network interface 410 may likewise be on common or separate motherboards.

Figure 5:
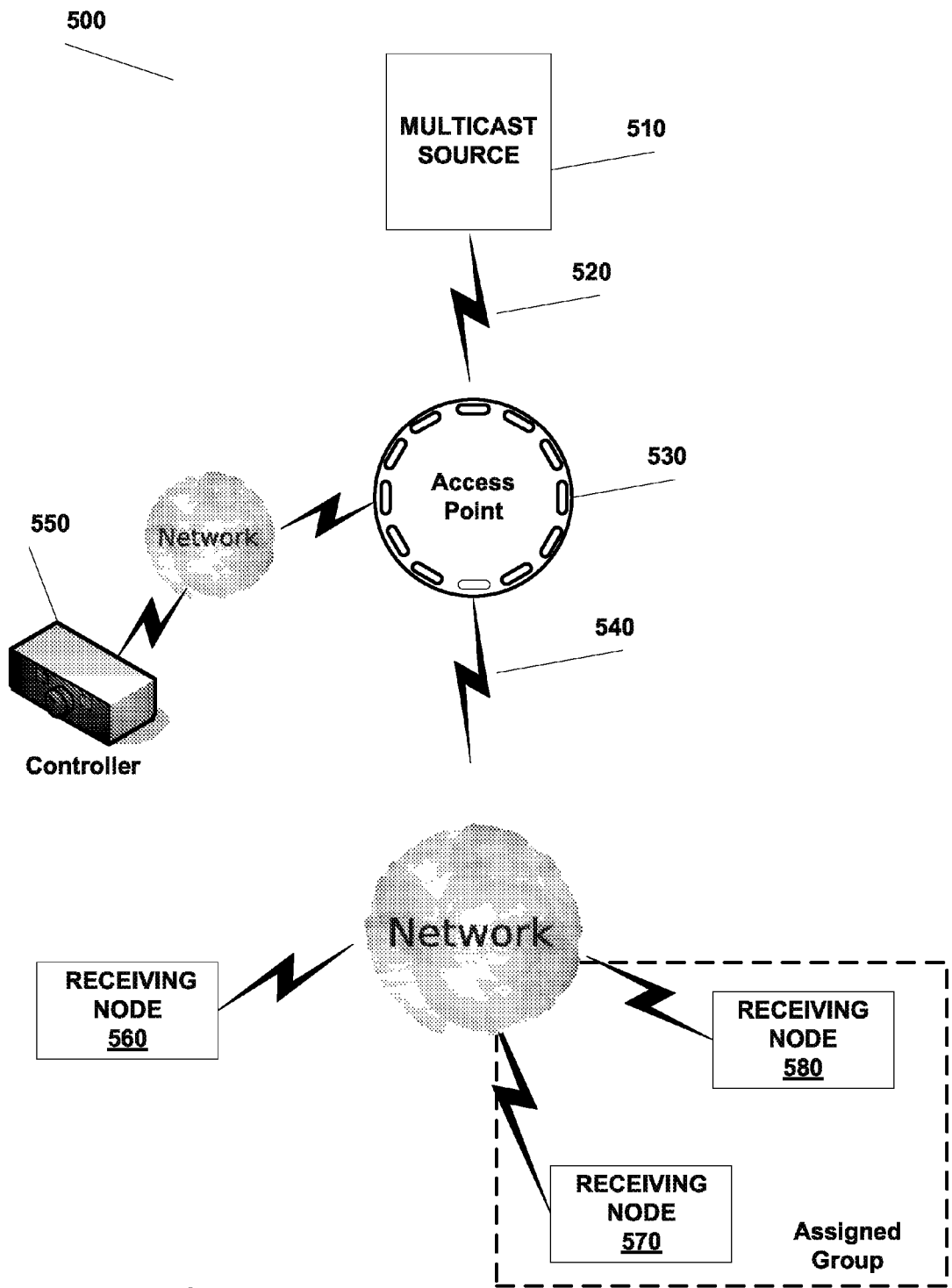
FIG. 5 illustrates a system for Internet-Protocol based communications in a wireless network.

FIG. 5 illustrates a system 500 for Internet-Protocol based communications in a wireless network. The system 500 illustrated in FIG. 5 includes an access point 530, which may be similar to the apparatus 400 of FIG. 4. The access point 530 of FIG. 5 includes a network interface (not shown) to receive a series of multicast data packets 520 from a multicast source 510. The access point 530 further includes memory (not shown) for storing instructions executable by a processor to convert the received series of multicast data packets into one or more unicast packets 540 in response to instructions received from a controller 550.

Controller 550 of FIG. 5 is physically distinct from but communicatively coupled to the access point 530. The communicative coupling may be via a wireless network, a direct communicative coupling (e.g., a wired connection), or a proxy arrangement. The controller 550 in FIG. 5 identifies one or more receiving nodes (560, 570, 580) in a wireless network requesting data corresponding to the series of multicast data packets 520. The controller 550 determines that the effective unicast rate for the one or more unicast data packets exceeds a minimum data rate of the series of multicast data packets using an 802.x protocol. The controller 550 may be implemented in any number of configurations, including those described in the context of FIG. 4.

Like the controller of FIG. 4, controller 550 may assign each of the one or more receiving nodes (560, 570, 580) in the wireless network to a group of receiving nodes. Like the apparatus of FIG. 4, the access point 530 may include multiple radios. Each group of receiving nodes may be assigned to one or more of the multiple radios, each of those radios being coupled to a wireless network interface to wirelessly transmit the one or more unicast data packets to the group of receiving nodes assigned to the radio using an 802.x protocol. The access point 530 may include a wireless network interface to allow for the wireless transmission of the one or more unicast data packets to a group of receiving nodes from the one or more receiving nodes (560, 570, 580) requesting the data corresponding to the one or more multicast data packets.

In a still further embodiment of the present invention, a system for Internet-Protocol based communications in a wireless network may include a motherboard and controller. The motherboard includes a network interface to receive a series of multicast data packets and memory storing instructions executable by a processor to convert the received series of multicast data packets into one or more unicast packets in response to instructions received from a controller. The motherboard further includes a radio. Such a motherboard may be installed in an apparatus 400 like that described in FIG. 4 and/or the access point 530 of FIG. 5.

The controller, of this particular embodiment, is communicatively coupled to the radio at the motherboard over a wireless network. The controller identifies one or more receiving nodes in the wireless network requesting data corresponding to the series of multicast data packets, and determines that the effective unicast rate for the one or more unicast data packets exceeds a minimum data rate of the series of multicast data packets using an 802.x protocol.

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated. The scope of the invention should, therefore, be determined not with reference to the above description, but instead should be determined with reference to the appended claims along with their full scope of equivalents.

What is claimed is:

1. An apparatus for Internet-Protocol based communications in a wireless network, the apparatus comprising:
   a network interface to receive a plurality of multicast data packets, from a wireless access point;
   a memory; and
   a processor, the processor executing instructions stored in the memory to:
      identify one or more receiving nodes in the wireless network requesting data corresponding to the plurality of multicast data packets,
      determine that an effective unicast rate for one or more unicast data packets exceeds a minimum data rate of the plurality of multicast data packets using a wireless protocol, and
      convert the received plurality of multicast data packets into one or more unicast packets, in response to instructions received by the processor.

2. The apparatus of claim 1, wherein the processor executes a software application stored in memory, independent of the instructions stored in the memory, to convert the received plurality of multicast data packets into one or more unicast packets, to identify the one or more receiving nodes and to determine that the effective unicast rate for the one or more unicast data packets exceeds a minimum data rate of the plurality of multicast data packets.

3. The apparatus of claim 1, wherein the processor further executes instructions stored in the memory to assign each of the one or more receiving nodes in the wireless network to a group of receiving nodes.

4. The apparatus of claim 3, further comprising a plurality of radios, wherein each group of receiving nodes is assigned to one or more radios from the plurality of radios, and wherein each of the plurality of radios is coupled to a wireless network interface to wirelessly transmit the one or more unicast data packets to the group of receiving nodes assigned to the radio using an 802.x protocol.

5. The apparatus of claim 1, wherein the network interface is a wired computer network interface.

6. The apparatus of claim 4, wherein each group of receiving nodes is assigned to one or more radios from a plurality of radios at the wireless access point, the processor sends the one or more unicast data packets over the network interface to the wireless access point and the wireless access point transmits the one or more unicast packets over the one or more radios to each group of receiving nodes.

7. The apparatus of claim 1, further comprising a wireless network interface to wirelessly transmit the one or more unicast data packets to a group of receiving nodes from the one or more receiving nodes requesting the data corresponding to the one or more multicast data packets.

8. The apparatus of claim 7, wherein the processor, the memory, and the wireless network interface are on a common motherboard.

9. The apparatus of claim 7, wherein the processor and the wireless network interface are on separate boards.

* * * * *